S. S. DUBBS.
DETACHABLE WASHER.
APPLICATION FILED JAN. 20, 1922.
1,425,182.
Patented Aug. 8, 1922.
Fig. 1.
Fig. 2.
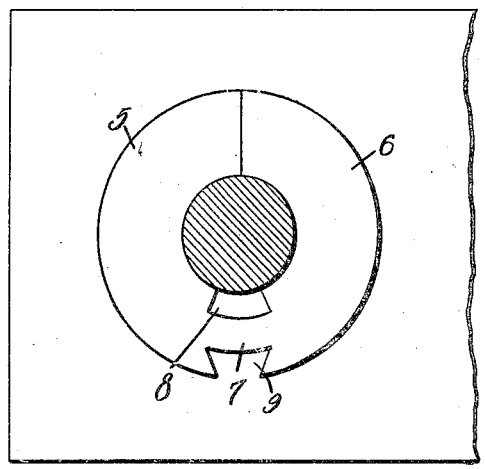
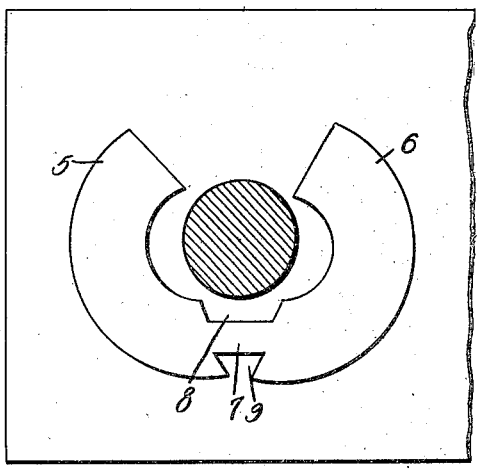
Fig. 3.
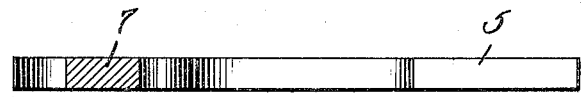
S. S. Dubbs   Inventor
By          Attorney

UNITED STATES PATENT OFFICE.

SYLVESTER S. DUBBS, OF CLARENDON, TEXAS.

DETACHABLE WASHER.

1,425,182.  Specification of Letters Patent.  Patented Aug. 8, 1922.

Application filed January 20, 1922. Serial No. 530,707.

*To all whom it may concern:*

Be it known that I, SYLVESTER S. DUBBS, citizen of the United States, residing at Clarendon, in the county of Donley and State of Texas, have invented a new and useful Detachable Washer, of which the following is a specification.

This invention has reference to washers, the primary object of the invention being to provide a washer which may be positioned on a bolt, eliminating the necessity of removing the bolt or nut to apply the same.

Another object of the invention is to provide a washer of this character constructed in a manner to prevent the same from becoming accidentally displaced after the same has been positioned.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a plan view of a washer constructed in accordance with the present invention, and showing the same as positioned on a bolt and in its active position.

Figure 2 is a plan view of a washer showing the same as positioned on a bolt, and showing the washer in its extended or inactive position.

Figure 3 is a sectional view taken through the washer.

Referring to the drawing in detail, the washer includes opposed sections 5 and 6, which are connected as by means of the strip of metal 7, which is formed by the cut out portions 8 and 9.

The cut out portion 8, which is disposed in the inner wall of the washer has inclined walls, permitting the sections 5 and 6 to move with respect to each other, while the cut out portion 9, which is formed in the periphery of the washer also allows movement of the sections 5 and 6 with respect to each other, and at the same time prevent breaking of the washer at the point of connection between the sections.

In the use of the washer, it will be seen that when the sections are in positions as illustrated by Figure 2 of the drawing, the washer may be slid into position under a nut, positioned on a bolt, eliminating the necessity of removing the nut to accomplish the positioning of the washer.

It might be further stated that when the washer has been slid under a nut, the sections 5 and 6 may be moved into close engagement with the bolt surrounded by the washer, the flexibility of the metal of which the washer is formed being sufficient to hold the washer in such position.

Having thus described the invention, what is claimed as new is:—

A washer including opposed sections, said washer having a cut out portion formed in the periphery thereof and having a cut out portion formed in the inner wall thereof, said cut out portions adapted to permit the sections to move with respect to each other, and said sections adapted to be moved into close engagement with a bolt.

In testimony that I claim the foregoing as my own, I have hereto affixed my signature in the presence of two witnesses.

SYLVESTER S. DUBBS.

Witnesses:
A. A. LEDBETTER,
J. COBB HARRIS.